(12) United States Patent
Faber et al.

(10) Patent No.: US 8,513,827 B2
(45) Date of Patent: Aug. 20, 2013

(54) ELECTRICAL DRIVE MACHINE HAVING A STATOR AND A ROTOR

(75) Inventors: Thomas Faber, Woerth-Maximiliansau (DE); Michael Bayer, Ludwigsburg (DE); Sven Hartmann, Stuttgart (DE); Dirk Buehler, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 561 days.

(21) Appl. No.: 12/745,318

(22) PCT Filed: Nov. 27, 2008

(86) PCT No.: PCT/EP2008/066336
§ 371 (c)(1),
(2), (4) Date: Oct. 22, 2010

(87) PCT Pub. No.: WO2009/068609
PCT Pub. Date: Jun. 4, 2009

(65) Prior Publication Data
US 2011/0025063 A1 Feb. 3, 2011

(30) Foreign Application Priority Data

Nov. 30, 2007 (DE) .......................... 10 2007 058 912

(51) Int. Cl.
*H02K 13/00* (2006.01)
(52) U.S. Cl.
USPC ............................................ 290/48; 310/237
(58) Field of Classification Search
USPC ................ 290/36 R, 38 R, 48; 310/237, 248
See application file for complete search history.

(56) References Cited

U.S. PATENT DOCUMENTS

| 3,387,151 | A | * | 6/1968 | Selgin | 310/46 |
|---|---|---|---|---|---|
| 5,128,577 | A | * | 7/1992 | Kobayashi | 310/233 |
| 7,109,628 | B2 | * | 9/2006 | Yamamoto et al. | 310/239 |
| 7,307,368 | B2 | * | 12/2007 | Tsurukawa et al. | 310/237 |
| 7,928,629 | B2 | * | 4/2011 | Aoyama et al. | 310/248 |
| 8,106,609 | B2 | * | 1/2012 | Haussecker et al. | 318/266 |
| 2004/0145268 | A1 | | 7/2004 | Yamamoto et al. | |

FOREIGN PATENT DOCUMENTS

| DE | 38 06 032 | 9/1988 |
|---|---|---|
| DE | 101 33 540 | 1/2002 |
| DE | 103 55 647 | 7/2004 |
| DE | 10 2005 048 599 | 4/2007 |
| JP | 62-230340 | 10/1987 |
| JP | 63-209448 | 8/1988 |
| JP | 9-135559 | 5/1997 |
| JP | 2002-34223 | 1/2002 |
| JP | 2006-353019 | 12/2006 |
| WO | WO 2007/039642 | 4/2007 |

OTHER PUBLICATIONS

International Search Report for PCT/EP2008/066336 dated Mar. 23, 2009.

* cited by examiner

*Primary Examiner* — Nicholas Ponomarenko
(74) *Attorney, Agent, or Firm* — Kenyon & Kenyon LLP

(57) ABSTRACT

An electric drive machine having a stator and a rotor, the rotor carrying a rotor winding, in slots, which is able to be supplied with electric current by a power supply system made up of a commutator and sliding contacts, the sliding contacts pressing on the surface of the commutator having at least two pairs each made up of one positive sliding contact and one negative sliding contact, and in the case of at least one first pair of a positive sliding contact and a negative sliding contact, the positive sliding contact and the negative sliding contact being opposed at an angle γ, which deviates from 180°.

12 Claims, 3 Drawing Sheets

ELECTRICAL DRIVE MACHINE HAVING A STATOR AND A ROTOR

RELATED APPLICATION INFORMATION

The present application is a national phase application based on international application PCT/EP2008/066336, which was filed on Nov. 27, 2008, and claims priority to German Application DE 10 2007 058 912.5, which was filed on Nov. 30, 2007, all of which are hereby incorporated by reference in their entirety.

FIELD OF THE INVENTION

The present invention relates to an electric drive machine (motor for a starting device) having a stator and a rotor, the rotor being able to be supplied with electric current via a commutator and sliding contacts (brushes).

BACKGROUND INFORMATION

It is understood that electric drive machines are in widespread use. The current for driving the electric drive machine is introduced, in this instance, via one or more pairs of sliding contacts via the commutator into the rotor winding (armature winding). In most cases, these sliding contacts are made of a sintered material, which predominantly includes copper and graphite components. These sliding contacts as well as the commutator are subject to wear during operation. Starting devices are typically designed for short-term operation, and are normally suitable for 30,000 to 60,000 switching cycles.

If the starting device is to reach a higher load and a larger number of operations, the sliding contacts have to have a uniform load for a maximum possible number of operations to be achieved. At the present time, arrangements are selected for systems having 4 or 6 sliding contacts in which the sliding contacts have an angular distance of 60° from one another. This means that, in a system having 6 sliding contacts, there is in each case an angle of 60° between the sliding contacts. In a system having 4 sliding contacts, for one, there is in each case one positive sliding contact and one negative sliding contact directly opposite, that is, at an angle of 180°, and a second pair of sliding contacts, which is in itself again distanced by 180° is arranged in such a way that this second sliding contact pair is offset with its negative sliding contact by 60° from the positive sliding contact of the first sliding contact pair.

Based on the use of a bar number of the commutator that is not divisible by the pole number of the stator for starter motors (electric drive machine), as a rule, 28 bars or 23 bars, the result is a different stress on the positive sliding contacts and the negative sliding contacts, since the sliding contact pair rotational direction takes up different positions in the case of connecting a conductor of the rotor winding and in the case of switching off a conductor of the rotor winding on the bars. This difference has the effect that the sliding contact pairs are stressed differently, or rather, for individual sliding contact pairs, a different load profile is created. For one rotational direction of the drive machine, individual sliding contacts are acted upon using a different current load when running onto a bar or when running off a bar. As a result, the carbon brushes age or wear to a different degree, so that the achievable service life is unnecessarily reduced because of the greater wear of individual sliding contacts.

Therefore, there exists the object of prolonging the achievable service life of a drive machine, of the type named above, by making the service life of the individual sliding contacts as equal as possible among themselves. Thus, it may happen, for example that, at the end of the service life of a passenger car, the starting device has also reached the end of its service life with respect to its mechanics. But if one looks at the sliding contacts, one will frequently determine that, of four sliding contacts used, only one of the sliding contacts has worn down in the scope provided, while under certain circumstances, other sliding contacts of the same starting device have worn down only by ⅓ of the provided wear length of the sliding contacts. Now, if the required number of operations, and with that, the required number of starts of a starter, rises because of an operation having frequent repeated starts of the internal combustion engine, one has to take care of an optimum distribution of the current load and the load peaks for the sliding contacts.

Another alternative, namely, the extension of the sliding contact that is especially stressed, or of all the sliding contacts, is unsuccessful, as a rule, because a greater diameter of the pole tube of the electric drive machine is not disposable. An optimum distribution of the current load and the load peaks for the sliding contacts may be achieved, especially in the case of armatures or rotors having wave winding and not having a whole number ratio of bar number and pole pair of the stator because of a particular distribution of the sliding contacts over the circumference of the commutator. In the case of sufficiently great overlapping of the sliding contacts with the bars, in order to obtain an ideal division of the load and the load peaks over the sliding contacts, we have found that the optimal arrangement of the sliding contacts is not at an equiangular distance of the sliding contacts to one another. Depending on the rotational direction, one or more of the sliding contacts has to be offset by about 1°, up to a value of a quotient of 360° and the bar number of the commutator in, or counter to the rotational direction, compared to the symmetrical values at the respective angles (quotient of 360° and the pole number).

This achieves minimizing the current load maxima in the individual sliding contacts, and also as low as possible a variation between the sliding contacts. The load peaks and the integral currents thus may be lowered up to 25%, and differences in the wear of the individual sliding contacts, known from endurance tests, may also be minimized. In individual starter systems, the equalization may mean differences in wear over the service life of up to 2 mm, which at the same time may mean up to more than 30% of the possible wear length of a sliding contact.

SUMMARY OF THE INVENTION

In an electric drive machine having the features of claim 1, the advantage arises that, compared to a design approach having, as described above, equidistant angular distances of the sliding contacts, a clear extension of the service life of the drive machine is able to be achieved. Since this advantage applies to the electric drive machine also in combination with the features of the dependent claims, this advantage will not be cited any further.

The exemplary embodiments and/or exemplary methods of the present invention is of advantage quite especially if the electric drive machine is a part of a starting device for internal combustion engines, and in that case, especially of motor vehicles. The use of a starting device, having an electric drive machine having one of the features according to the claims recited below, is of advantage quite especially when the motor vehicle is operated using this starting device in a so-called start-stop operation. A start-stop operation is present, for example, if the vehicle is able to detect automatically the standstill of the motor vehicle, in which the starting device is being operated, and in this connection, shuts down the internal combustion engine or combustion engine.

A further feature of such a start-stop system is that the vehicle recognizes signals, given by the driver, which indicate that the vehicle is to be set in motion again, and accordingly, the internal combustion engine or combustion engine is started again, by the starting device being able to cause the usual starting process (meshing, engaging, cranking, switching off a stator relay, disengaging) automatically, that is, without human operation of the starting switch. In addition, such a start-stop system may also include a so-called impulse starting method in which, in cases in which the vehicle is not supposed to transfer drive energy to the roadway, it also automatically shuts down the internal combustion engine and, upon a recognizable command from the driver for drive energy that is again to be transferred, causes the starting process as in start-stop operation, as was described before.

The exemplary embodiments and/or exemplary methods of the present invention will be elucidated in greater detail in the following text based on the figures.

DETAILED DESCRIPTION

Figure 1:
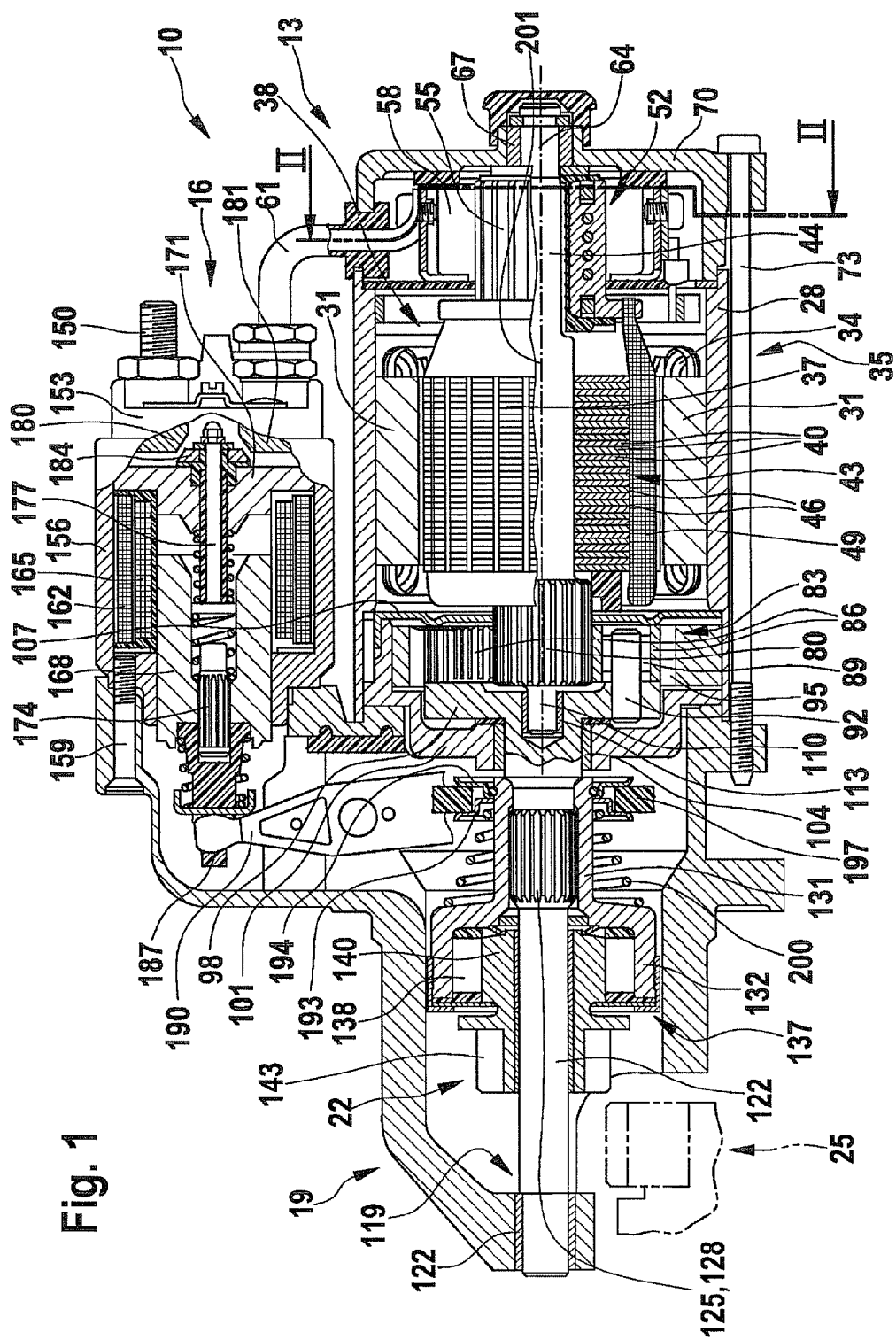
FIG. 1 shows a starting device in a longitudinal section.

FIG. 1 shows a starting device in longitudinal section. A starting device 10 is represented in FIG. 1. This starting device 10 has a starter motor 13 and an engaging relay 16, for example. Starter motor 13 and engaging relay 16 are fastened to a common drive-end bracket 19. Starter motor 13 is used functionally to drive a starting pinion 22 when it is engaged in ring gear 25 of the internal combustion engine that is not shown here.

Starter motor 13 as the electric drive machine of the starting device has as housing a pole tube 28, which carries pole shoes 31 on its inner diameter, which are each wound with a field winding 34. Pole tube 28 having pole shoes 31 and field windings 34 forms a stator 35. In turn, pole shoes 31 surround an armature 37 (which is a rotor 38), which has an armature core 43 constructed of bars 40 and an armature winding or rotor winding 49 situated in slots 46. Armature core 43 is pressed onto a drive shaft 44. At the end of drive shaft 44 facing away from starting pinion 22, a commutator 52 is also mounted which, among other things, is constructed of individual commutator bars 55. Commutator bars 55, in a known way, are electrically connected to armature winding 49 in such a way that, when current is applied to commutator bars 55 by carbon brushes or sliding contacts 58, a rotary motion of armature 37 in pole tube 28 comes about. In closed-circuit condition, a power supply 61 between engaging relay 16 and starter motor 13 supplies both carbon brushes 58 and field winding 34 with current. Drive shaft 44 is supported on the commutator side using a shaft extension 64 in a journal bearing 67, which is in turn held in place in a commutator bearing cover 70. Commutator bearing cover 70, in turn, is fastened in drive end shield 19 using tension rods 73 (screws, 2, 3 or 4 of them), which are situated distributed about the circumference of pole tube 28. In this instance, pole tube 28 is supported on drive-end bracket 19, and commutator bearing cover 70 on pole tube 28.

A so-called sun wheel adjoins armature 37 in the drive direction, and it is a part of a planetary gear 83. Sun wheel 80 is surrounded by several planet wheels 86, usually three planet wheels 86, which are supported on axle journals 92 using roller bearings 89. Planet wheels 86 ride on a ring gear 95, which is supported on the outside in pole tube 28. A planet carrier 98 adjoins planet wheels 86 in the direction towards the drive side, in which axle journals 92 are accommodated. Planet carrier 98, in turn, is supported in an intermediate bearing 101 and a journal bearing 104 situated in the latter. Intermediate bearing 101 is designed to be cup-shaped in such a way that both planet carrier 98 and planet wheels 86 are accommodated in it.

Furthermore, in cup-shaped intermediate bearing 101, ring gear 95 is situated which ultimately is closed off by a cover 107 from armature 37. Intermediate bearing 101 is also supported by its outer circumference on the inside of pole tube 28. At the end of drive shaft 44, facing away from commutator 52, armature 37 has an additional shaft extension 110 that is also accommodated in a journal bearing 113. Journal bearing 113, in turn, is accommodated in a central bore of planet carrier 98. Planet carrier 98 is connected as one piece to driven shaft 116. This driven shaft 116 is supported at its end 119 facing away from intermediate bearing 101 in an additional bearing 122, which is fastened in drive-end bracket 19. Driven shaft 116 is subdivided into different sections: Thus the section that is situated in journal bearing 104 of intermediate bearing 101 is followed by a section having so-called straight-tooth bevels 125 (internal toothing), which is part of a so-called shaft-driving collar connection. This shaft-driving collar connection 128, in this case, enables the axially straight-line sliding of a follower 131. This follower 131 is a sleeve-like extension which is made in one piece with a cup-shaped outer ring 132 of free-wheel 137. This free-wheel 137 (unidirectional coupling) is further made up of inner ring 140, which is situated radially within outer ring 132. Between inner ring 140 and outer ring 132, sprags 138 are situated. These sprags 138, in cooperation with the inner ring and the outer ring, prevent the relative rotation between the outer ring and the inner ring in a second direction. In other words: Free-wheel 137 enables a relative motion between inner ring 140 and outer ring 132 in only one direction. In this exemplary embodiment, inner ring 140 is developed in one piece with starting pinion 22 and its helical gear 143 (outer helical gear).

For the sake of completeness, let us examine the engaging mechanism. Engaging relay 16 has a bolt 150 which is an electrical contact, and which is connected to the positive pole of an electric starter battery, which is not shown here. This bolt is guided through a relay cover 153. This relay cover 153 closes off a relay housing 156, which is fastened to drive-end bracket 19, using several fastening elements 159 (screws). In engaging relay 16 there are also situated a pull-in winding 162 and a so-called hold-in winding 165. Pull-in winding 162 and hold-in winding 165 each act to form an electromagnetic field in the switched-on state, which flows through relay housing 156 (made of electromagnetically conductive material), through a linearly movable armature 168 and an armature magnetic yoke 171. Armature 168 carries a push rod 174 which, when armature 168 is linearly drawn in, is moved in the direction of a switching bolt 177. With this motion of push rod 174 to switching bolt 177, the latter is moved from its rest position in the direction towards two contacts 180 and 181, so that a contact bridge 184, mounted at the end of switching bolt 177 going towards the contacts 180 and 181, electrically connects the two contacts 180 and 181 to each other. Thereby electric power is conveyed from bolt 150, past contact bridge 184 to electric power supply 61 and therewith to carbon brushes 58. This causes current to flow through starter motor 13.

Engaging relay 16, or rather armature 168, in addition also has the task of moving a lever situated rotationally movable at drive-end bracket 19, using a pulling element 187. This lever 190, usually designed as a fork lever, encompasses two disks 193 and 194, using two "prongs" at their outer circumference, not shown here, in order to move a engaging piece 197, clamped between the latter, towards free-wheel 137 against the resistance of spring 200, and thereby to engage starting pinion 22 with ring gear 25.

Commutator 52 described here is designed as a drum commutator, whose commutator bars 55 are each oriented in parallel to one another and whose electrical separation is carried out in the circumferential direction. This means that commutator bars 55 have no beveling. Slots 46 of rotor 38, in which rotor winding 49 is situated, are aligned parallel to rotational axis 201 of rotor 38.

Figure 2:
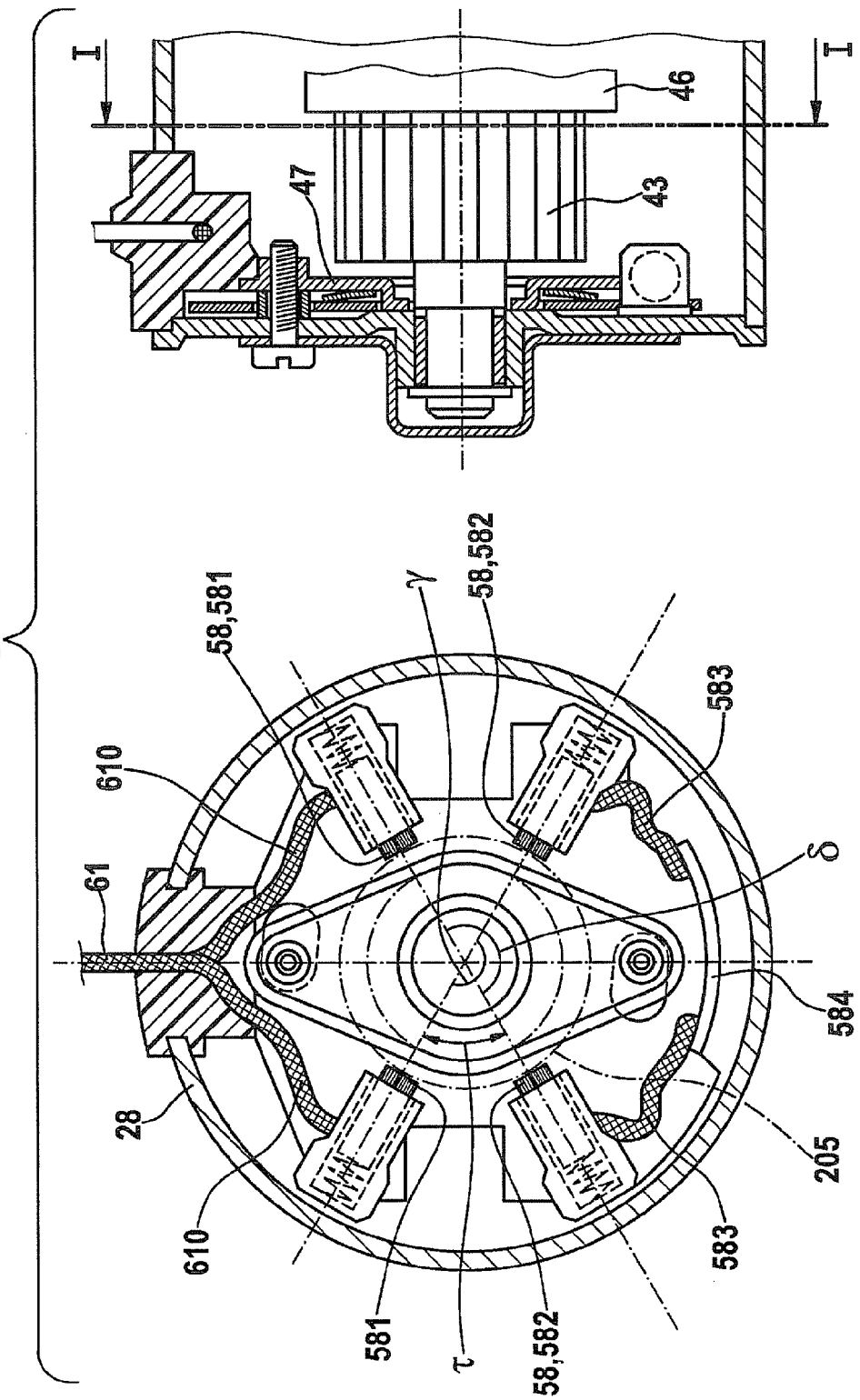
FIG. 2 shows a cross section through the pole tube according to the details in FIG. 1, and there, the view onto 4 sliding contacts.

In FIG. 2, corresponding to the marking in FIG. 1, a cross section is shown through pole tube 28 of starting device 10. Via two power supply conductors 610, power supply 61 guides the voltage to positive sliding contacts 581. Commutator 52 is shown here only schematically, by a dashed-dotted circular line 205. The other two sliding contacts 58 in this exemplary embodiment are negative sliding contacts 582, since they are connected to the negative pole of a starter battery that is not shown here. The two negative sliding contacts 582 are connected by two negative conductors 583 designed as litz wires to a common metal contact sheet 584, in this case by a welded connection. Metal contact sheet 584, in turn, is connected to the negative pole of the starter battery by surface contact to the inside of pole tube 28.

In the system shown in FIG. 2, the total of 4 sliding contacts 58 form a total of 2 pairs. The first pair includes positive sliding contact 581, which is at a position of 10 o'clock with reference to a normal analog clock dial, and negative sliding contact 582 which is shown there at approximately the 4 o'clock position. Actually, negative brush 582, which is drawn here at 4 o'clock, is at a position that deviates from 4 o'clock. This deviation is given by the angle γ, which describes the angle between the two radii starting from positive sliding contact 581 and negative sliding contact 582 and going to the center, that is, rotational axis 201. In the case of the second pair of the other positive sliding contact 581 and the other negative sliding contact 582, in this exemplary embodiment, the two sliding contacts 581 and 582 are opposed in such a way that the angle between the radii, starting from the two sliding contacts 581 and 582, is 180°.

Accordingly, an electric drive machine (starter motor 13) is shown, having a stator 35 and a rotor 38, rotor 38 carrying a rotor winding 49, in slots 46, which are able to be supplied with electric current by a power supply system made up of a commutator 52 and sliding contacts 58, sliding contacts 58 pressing on the surface of commutator 52 having at least two pairs each, made up of one positive sliding contact 581 and one negative sliding contact 582. In the case of at least one first pair made up of one positive sliding contact 581 and one negative sliding contact 582, positive sliding contact 581 and negative sliding contact 582 are opposed to each other at an angle γ, which deviates from 180°. The concept of "face each other at an angle that deviates from 180°" is understood in this Application to mean that these two brushes are able to face each other at an angle γ which is able to deviate from 180° by up to 28°, and may accordingly amount to up to 152°. In other words: The angle γ is able to amount to between 152° and 179°. In this context, the angle γ is the angle included by the two sliding contacts 581 and 582, in this included range a negative sliding contact 582 of the other pair being situated.

The deviations of up to 28° from the 180° opposing position comes about from the experience according to which the deviation is permitted to deviate by up to an amount having the value of the quotient of 360° and the bar number $N_L$ of commutator 52 from an angle of 180°, the bar number $N_L$ in each case being inclusively between 13 and 17 or 18 and 23 or 35 and 29 or 31 and 35. The bar numbers $N_L=23$ and 28 have been shown in this context as being especially advantageous. The angle between negative sliding contact 582 and positive sliding contact 581 of the first sliding contact pair should accordingly be less than 180°. This angle includes negative sliding contact 582 of the other sliding contact pair. One further condition of the exemplary embodiment of FIG. 2 may be, for example, that an angle δ between positive sliding contact 581 and negative sliding contact 582 of the second sliding contact pair include between them an angle δ of 180°. It may be provided, in this context, that, as drawn in this exemplary embodiment, positive sliding contact 581 of the second pair is at a distance from the positive sliding contact of the first pair of 120° in a rotational direction of the rotor. Stator 35 of the electric drive machine should be implemented as a six-pole stator 35. In contrast to the description mentioned before, pole trace 31 could not only be electrically excited by a field winding 34, but alternatively these pole shoes could also be made of permanent magnetic material. With respect to the ratio of bar number $N_L$ of commutator 52 and pole number $N_p$ of stator 35 the condition should further apply that the quotient of bar number $N_L$ and pole number $N_p$ is not an integer.

Armature winding 49 or rotor winding 49 situated in slots 46 is designed as a so-called wave winding.

Slots 46 are oriented in parallel to rotational axis 201, in this context.

The number of sliding contacts 58 is less than the number of $N_L$ of bars 55 of commutator 52.

Figure 3:
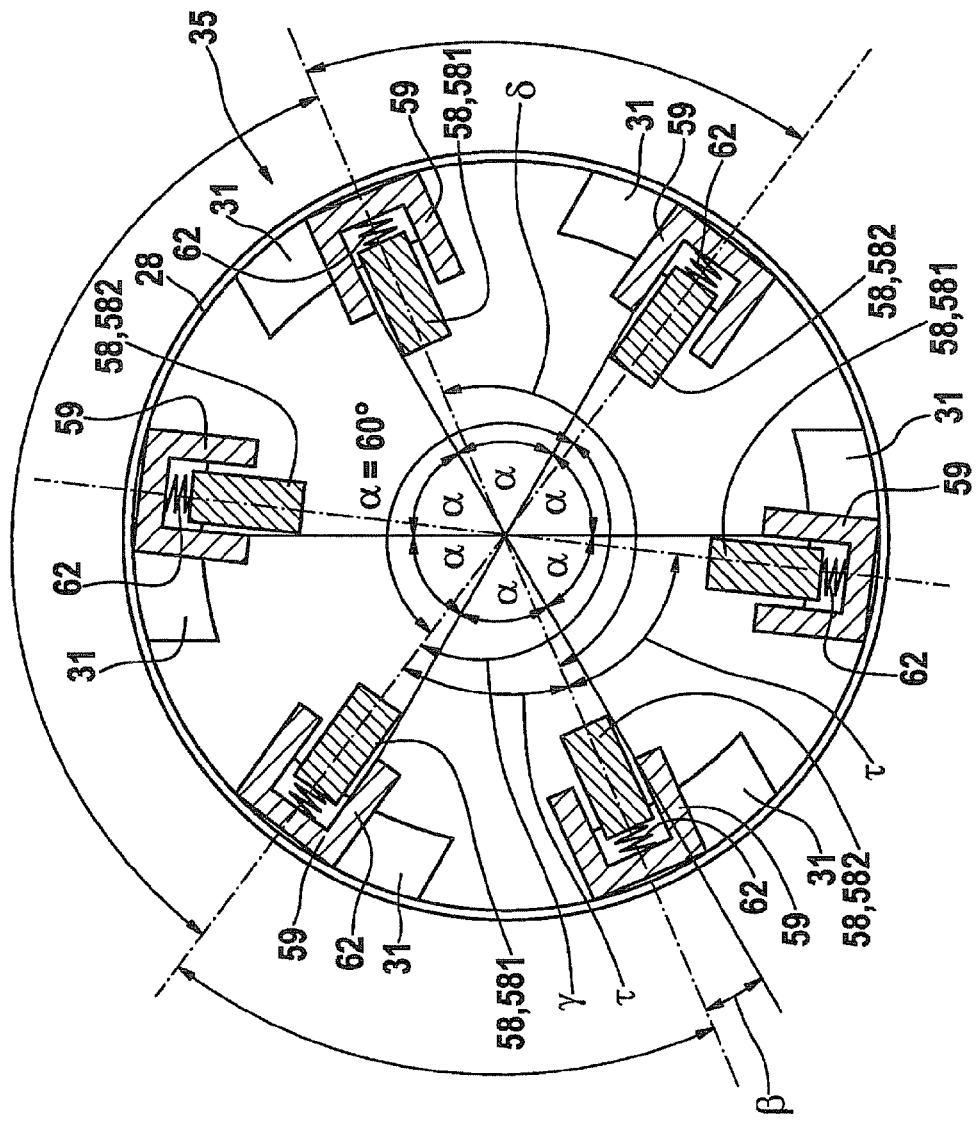
FIG. 3 shows a schematic sectional representation through a pole tube of the electric drive machine, along with the representation of the poles of the stator and the relative position of the sliding contact system with respect to the poles of the stator.

In a systematic way, FIG. 3 shows a further cross section through a pole tube 28 that is analogous to the representation in FIG. 2. As a difference, it may be seen here that the six-pole drive machine also has 6 sliding contacts 58. By analogy to the description for FIG. 2, this exemplary embodiment too has a first sliding contact pair made up of a positive sliding contact 581 and a negative sliding contact 582. In this context, positive sliding contact 581 is also approximately at a 10 o'clock position. Analogously, negative sliding contact 582 is at a 4 o'clock position. Between the two sliding contacts of the first sliding contact pair, there is also an angle γ that deviates from 180°. The second sliding contact pair is made up here too of a positive sliding contact 581 and a negative sliding contact 582 at the 2 o'clock and the 8 o'clock positions, respectively. Between these two sliding contacts, an angle δ of 180° has been set. A third sliding contact pair is also present, made up of positive sliding contact 581 and negative sliding contact 582, which are, here too, oriented at an angle of 180° to each other. In this instance, the respective sliding contacts are at the 6 o'clock and 12 o'clock positions. The corresponding "clock time statements" for the position of the brushes are only approximate values in this Application, and are not furnished with exact angular degree readings.

The angle τ in FIG. 3 is 60° in each case.

All sliding contacts 58 are set into quiver-like sleeves 59 which lead sliding contacts 58 perpendicularly to the surface of commutator 52. In the process, sliding contacts 58 are pressed onto the surface of commutator 52 using spring elements 62.

These 6 sliding contacts, shown here in FIG. 3, also have a special relative position to pole shoes 31 of stator 35. Whereas pole shoes 31 are at a regular distance from one another at an angle α of 60°, this is only partially so in each case for sliding contacts 58, as was seen in the previous description. In addition, sliding contacts 58 of the first sliding contact pair (8 and 2 o'clock positions) are rotated by an angle β with respect to pole shoes 31. This angle β is a measure for the so-called brush rotation of the brushes at a regular distance from pole shoes 31.

Sliding contacts 58 have a sliding direction in the quiver-like sleeve that is aligned perpendicularly to the commutator surface.

It is provided that this electric drive machine is a stator motor 13, which is a part of a starting device 10 for internal combustion engines or combustion engines. Since the advantages mentioned at the outset (special durability of the sliding contacts and particularly uniform distribution of the durability of the sliding contacts) are especially useful when this starting device is a component of a vehicle, which makes a start-stop operation possible, it is provided that this starting device 10 be used in a motor vehicle which carries out a start-stop method as a special operating mode.

What is claimed is:

1. An electric drive machine, comprising:
   a stator; and
   a rotor carrying a rotor winding in slots, the rotor winding being suppliable with electric current by a power supply system made up of a commutator and sliding contacts,
   wherein the sliding contacts press on a surface of the commutator having at least two pairs of contacts, each made up of one positive sliding contact and one negative sliding contact, and
   wherein, for at least one first pair of the positive sliding contact and the negative sliding contact, the positive sliding contact and the negative sliding contact are opposed at an angle that deviates from an angle of 180°.

2. The electric drive machine of claim 1, wherein the angle between the negative sliding contact and the positive sliding contact of a pair deviates from an angle of 180° by an amount of approximately one degree up to an amount of the quantity of the quotient of 360° and a bar number $N_L$ of the commutator from an angle of 180°, the bar number $N_L$ in each case being inclusively: (i) between 13 and 17; (ii) between 19 and 23; (iii) between 25 and 29; and (iv) between 31 and 35.

3. The electric drive machine of claim 2, wherein the angle between the negative sliding contact and the positive sliding contact is less than an angle of 180°.

4. The electric drive machine of claim 1, wherein the positive sliding contact and the negative sliding contact of the second pair include an angle of 180° between themselves.

5. The electric drive machine of claim 1, wherein the positive sliding contact of the second pair is at a distance from the positive sliding contact of the first pair of 120° in a rotor rotational direction.

6. The electric drive machine of claim 1, wherein the stator has a six-pole configuration.

7. The electric drive machine of claim 1, wherein a quotient of the bar number $N_L$ and a pole number $N_p$ of the stator is not an integer.

8. The electric drive machine of claim 1, wherein the rotor winding situated in the slots of the rotor is a wave winding.

9. The electric drive machine of claim 1, wherein the number of the sliding contacts is less than the number $N_L$ of bars of the commutator.

10. A starting device, comprising:
    an electric drive machine, including:
       a stator; and
       a rotor carrying a rotor winding in slots, the rotor winding being suppliable with electric current by a power supply system made up of a commutator and sliding contacts,
       wherein the sliding contacts press on a surface of the commutator having at least two pairs of contacts, each made up of one positive sliding contact and one negative sliding contact, and
       wherein, for at least one first pair of the positive sliding contact and the negative sliding contact, the positive sliding contact and the negative sliding contact are opposed at an angle that deviates from an angle of 180°.

11. A method for operating a motor vehicle, the method comprising:
    using a starting device starting device, which includes an electric drive machine that includes:
       a stator; and
       a rotor carrying a rotor winding in slots, the rotor winding being suppliable with electric current by a power supply system made up of a commutator and sliding contacts,
       wherein the sliding contacts press on a surface of the commutator having at least two pairs of contacts, each made up of one positive sliding contact and one negative sliding contact, and
       wherein, for at least one first pair of the positive sliding contact and the negative sliding contact, the positive sliding contact and the negative sliding contact are opposed at an angle that deviates from an angle of 180°.

12. The method for operating a motor vehicle as recited in the preceding claim, wherein the method includes a start-stop method.

* * * * *

UNITED STATES PATENT AND TRADEMARK OFFICE
CERTIFICATE OF CORRECTION

PATENT NO. : 8,513,827 B2  Page 1 of 1
APPLICATION NO. : 12/745318
DATED : August 20, 2013
INVENTOR(S) : Faber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 704 days.

Signed and Sealed this
Fifteenth Day of September, 2015

Michelle K. Lee
*Director of the United States Patent and Trademark Office*